US010760988B2

(12) United States Patent
Sakakibara et al.

(10) Patent No.: US 10,760,988 B2
(45) Date of Patent: Sep. 1, 2020

(54) BOLT AXIAL FORCE MEASUREMENT APPARATUS AND BOLT AXIAL FORCE MEASUREMENT PROGRAM

(71) Applicants: HONDA MOTOR CO., LTD., Tokyo (JP); Ryoden Shonan Electronics Corporation, Kanagawa (JP)

(72) Inventors: Toshitsugu Sakakibara, Wako (JP); Kazuhiro Tsuzaki, Wako (JP); Toshiaki Ohashi, Kamakura (JP); Tsukasa Ishida, Kamakura (JP)

(73) Assignees: HONDA MOTOR CO., LTD., Tokyo (JP); RYODEN SHONAN ELECTRONICS CORPORATION, Kamakura-Shi (JP)

( * ) Notice: Subject to any disclaimer, the term of this patent is extended or adjusted under 35 U.S.C. 154(b) by 0 days.

(21) Appl. No.: 16/530,061

(22) Filed: Aug. 2, 2019

(65) Prior Publication Data

US 2020/0041369 A1      Feb. 6, 2020

(30) Foreign Application Priority Data

Aug. 3, 2018   (JP) ................................ 2018-147083

(51) Int. Cl.
   *G01L 5/24*   (2006.01)
(52) U.S. Cl.
   CPC .................................... *G01L 5/246* (2013.01)
(58) Field of Classification Search
   CPC ...................................................... G01L 5/246
   USPC ........................................................ 73/581
   See application file for complete search history.

(56) References Cited

U.S. PATENT DOCUMENTS

| 4,295,377 | A | 10/1981 | Couchman | |
| 5,156,050 | A * | 10/1992 | Schmid | ................. B06B 1/0681 |
| | | | | 73/628 |
| 5,343,785 | A | 9/1994 | Holt et al. | |
| 2010/0054891 | A1* | 3/2010 | Nishida | ................... F16B 31/02 |
| | | | | 411/9 |
| 2017/0138387 | A1* | 5/2017 | Saigo | ...................... G01L 1/125 |
| 2017/0156928 | A1* | 6/2017 | He | .......................... A61F 9/007 |
| 2017/0234837 | A1* | 8/2017 | Hall | ................... G01N 29/2431 |
| | | | | 73/602 |

(Continued)

FOREIGN PATENT DOCUMENTS

| JP | S61-34444 U | 3/1986 |
| JP | 62249051 | * 10/1987 |

(Continued)

OTHER PUBLICATIONS

Office Action received in corresponding Japanese application No. 2018-147083 dated Jun. 16, 2020 with English translation (8 pages).

*Primary Examiner* — Jacques M Saint Surin
(74) *Attorney, Agent, or Firm* — Rankin, Hill & Clark LLP

(57) ABSTRACT

A bolt axial force measurement apparatus of the present invention includes an echo detection section and an axial force calculation section. The echo detection section sets a head echo gate for the head echo and sets a bottom echo gate for the bottom echo, and executes tracking for a plurality of ultrasonic pulses emitted during tightening of the bolt so that the head echo gate and bottom echo gate are shifted independently to include the predetermined positions at the same position in the head echo gate and bottom echo gate.

8 Claims, 9 Drawing Sheets

(56) References Cited

U.S. PATENT DOCUMENTS

2018/0328797 A1* 11/2018 Gwon ...................... G01L 1/10

FOREIGN PATENT DOCUMENTS

| | | | |
|---|---|---|---|
| JP | H03-209139 A | | 9/1991 |
| JP | 404329329 | * | 11/1992 |
| JP | H05-99908 A | | 4/1993 |
| JP | H05-305536 A | | 11/1993 |
| JP | 11218452 | * | 8/1999 |
| JP | 2001281083 | * | 10/2001 |
| JP | 2004-219100 A | | 8/2004 |

* cited by examiner

BOLT AXIAL FORCE MEASUREMENT APPARATUS AND BOLT AXIAL FORCE MEASUREMENT PROGRAM

BACKGROUND OF THE INVENTION

1. Field of the Invention

The present invention relates to a bolt axial force measurement apparatus and a non-transitory computer readable medium storing a bolt axial force measurement program.

2. Description of the Related Art

A bolt axial force measurement method has conventionally been known that measures an axial force of a bolt by measuring an elongation of the bolt utilizing a B echo (bottom echo) of an ultrasound emitted from a head of the bolt toward a bottom face of a shank of the bolt. In such a bolt axial force measurement method, a space between an ultrasonic sensor, which emits an ultrasound, and the head of the bolt is filled with an ultrasound propagating medium. However, if the thickness of the propagating medium present between the ultrasonic sensor and the head of the bolt varies, it becomes impossible to measure the elongation of the bolt with high accuracy.

In view of this, a bolt axial force measurement method is disclosed that maintains the distance between an ultrasonic sensor and a head of a bolt by utilizing a projection projecting from the ultrasonic sensor side toward the head of the bolt (see, for example, Japanese Utility Model Registration Application Publication No. Sho 61-34444).

According to such a bolt axial force measurement method, since a uniform distance is maintained between the ultrasonic sensor and the head of the bolt, it is possible to measure an elongation of a bolt with high accuracy.

In the conventional bolt axial force measurement method (for example, Japanese Utility Model Registration Application Publication No. Sho 61-34444), the bolt axial force measurement apparatus receives only an echo from the bottom surface of the bolt (i.e. B echo) to take the elongation of the bolt caused by the application of the axial force into consideration when measuring the axial force of the bolt. However, as the distortion of the head part of the bolt caused by the application of the axial force is not taken into consideration in the bolt axial force measurement apparatus disclosed in Japanese Utility Model Registration Application Publication No. Sho 61-34444, the bolt axial force measurement apparatus may not be able to measure the axial force of the bolt with high accuracy. Further, due to the change in the contact status of the head part of the bolt and the ultrasonic sensor when fastening the bolt, the bolt axial force measurement apparatus may not be able to measure the axial force of the bolt with high accuracy either.

SUMMARY OF THE INVENTION

In view of the above, an object of the present invention is to provide a bolt axial force measurement apparatus and a non-transitory computer readable medium storing a bolt axial force measurement program which are capable of more securely measuring an axial force of a bolt with higher accuracy than the conventional technique.

A bolt axial force measurement apparatus for solving the above problem includes: an echo detection section which detects a head echo and a bottom echo of an ultrasonic pulse emitted from a head side of a bolt toward a bottom surface of a shank of the bolt, and an axial force calculation section which calculates an axial force of the bolt based on a time difference between predetermined positions of the head echo and bottom echo detected by the echo detection section, wherein the echo detection section sets a head echo gate for the head echo and sets a bottom echo gate for the bottom echo, and executes tracking for a plurality of ultrasonic pulses emitted during tightening of the bolt so that the head echo gate and bottom echo gate are shifted independently to include the predetermined positions at the same position in the head echo gate and bottom echo gate.

In addition, the non-transitory computer readable medium storing the bolt axial force measurement program causes a computer to function as the bolt axial force measurement apparatus.

According to the present invention, it is possible to provide a bolt axial force measurement apparatus and a non-transitory computer readable medium storing a bolt axial force measurement program which are capable of more securely measuring an axial force of a bolt with higher accuracy than the conventional technique.

DETAILED DESCRIPTION OF THE EMBODIMENTS

A mode for carrying out the present invention (a present embodiment) will be described in detail with reference to the drawings as appropriate. Hereinafter, a bolt axial force measurement apparatus including a tightening device (and a bolt axial force measurement program), a bolt axial force measurement method, and a bolt according to the present embodiment will be described in detail.

<<Bolt Axial Force Measurement Apparatus>>

The bolt axial force measurement apparatus in the present embodiment is configured to measure the axial force of a bolt while tightening the bolt. In addition, the bolt axial force measurement apparatus stops the tightening action when the axial force of the bolt reaches a predetermined value.

Figure 1:
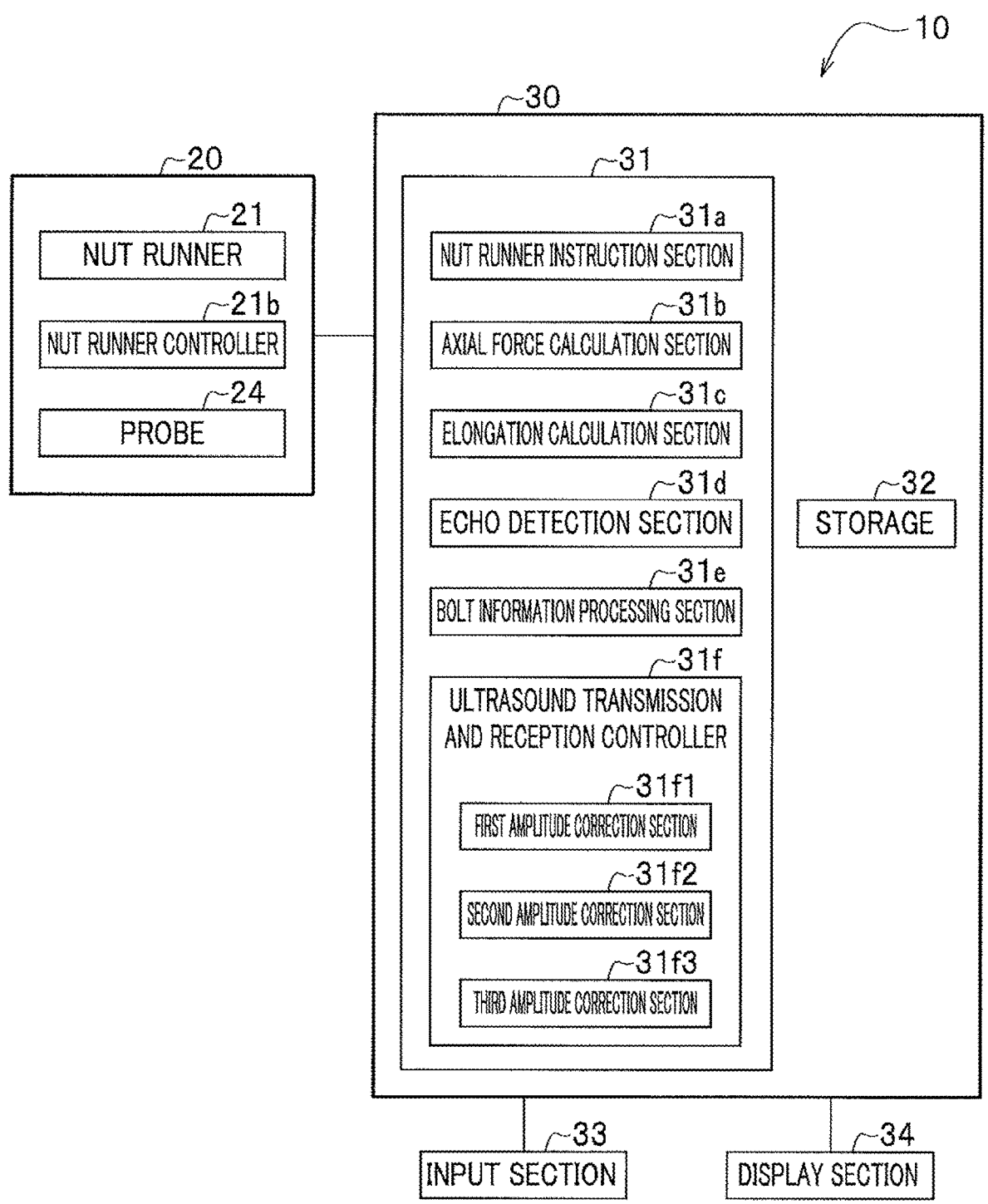
FIG. 1 is a block diagram of a bolt axial force measurement apparatus including a tightening device according to an embodiment of the present invention.

FIG. 1 is a block diagram of a bolt axial force measurement apparatus 10 according to the present embodiment.

As illustrated in FIG. 1, the bolt axial force measurement apparatus 10 according to the present embodiment mainly includes a tightening device 20 for a bolt, a controller 30, an input section 33, and a display section 34.

<Tightening Device>

First, the tightening device 20 will be described.

Figure 2:
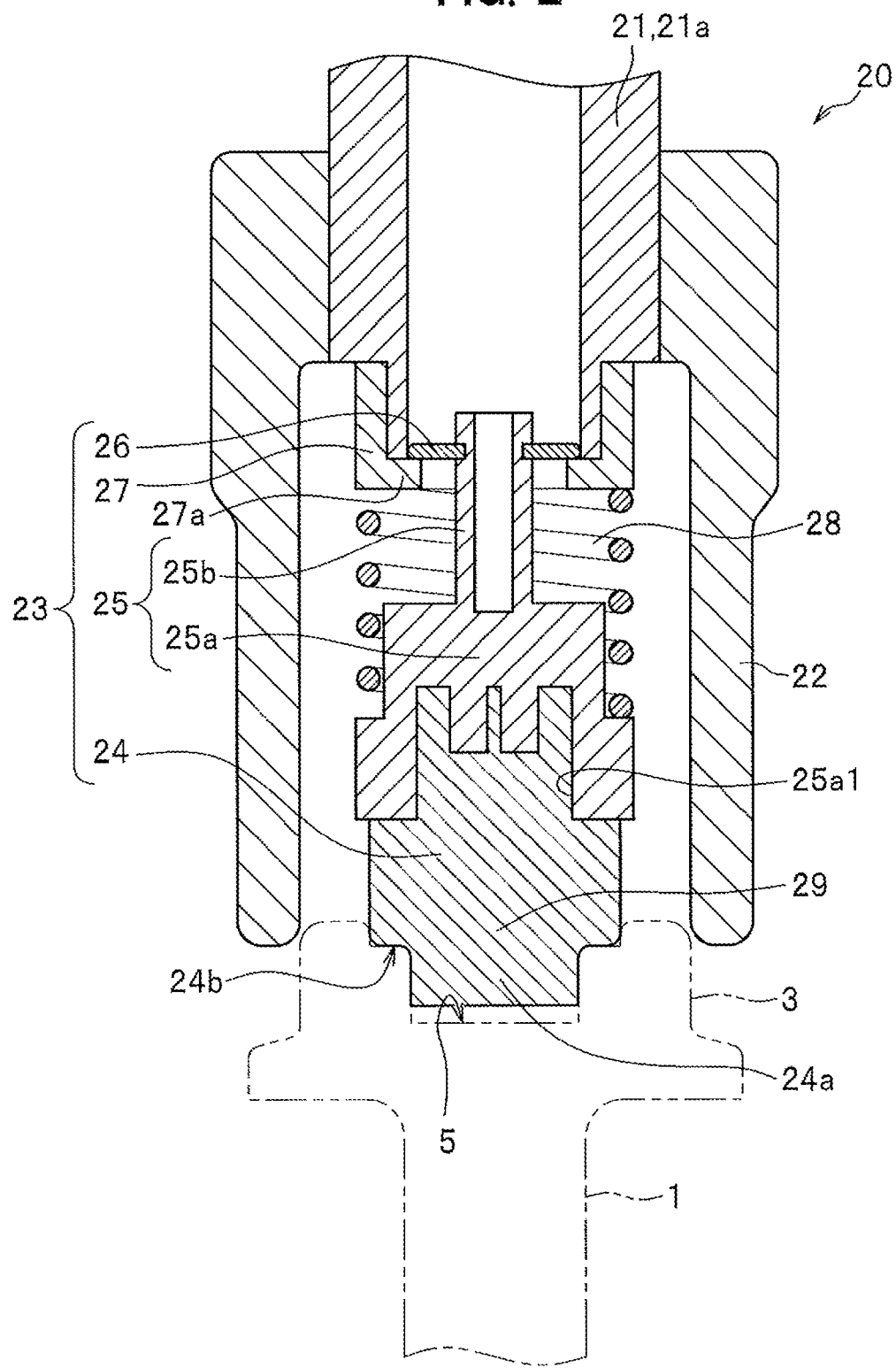
FIG. 2 is a partial enlarged cross-sectional view of the tightening device included in the bolt axial force measurement apparatus of FIG. 1.

FIG. 2 is a configuration explanatory view of the tightening device 20. In FIG. 2, a bolt 1 to be tightened by the tightening device 20 is indicated by an imaginary line (alternate long and two short dashed line).

As illustrated in FIG. 2, the tightening device 20 includes a nut runner 21, a probe unit 23, a resilient coil spring 28 as an urging unit, and a socket 22. The tightening device 20 also includes a nut runner controller 21b (see FIG. 1).

The nut runner 21 includes a rotary shaft 21a which is rotated at a predetermined torque and a predetermined rotation velocity (rotation angular velocity) by the nut runner controller 21b (see FIG. 1) described later. The rotary shaft 21a is formed in a tubular shape.

In addition, the nut runner 21 is configured such that the rotary shaft 21a is driven to rotate in accordance with an instruction outputted by the nut runner controller 21b (see FIG. 1). The nut runner 21 is also configured to stop in accordance with an instruction outputted by a nut runner instruction section 31a (see FIG. 1) described later.

The probe unit 23 includes a probe 24 (ultrasonic sensor), a probe support member 25, an attachment member 27 for the rotary shaft 21a, and a stopper member 26.

The probe 24 includes a piezoelectric element (not illustrated) which emits an ultrasonic pulse and receives an echo of the emitted ultrasonic pulse, and the like. An electric signal of the echo received by the probe 24 is outputted to the controller 30 (see FIG. 1) described later.

The probe 24 is formed in a substantially columnar shape. In addition, at the center of a lower end face of the probe 24, a projection 24a having a substantially columnar shape and projecting downward is formed. With this, in the lower end portion of the probe 24, a stepped protrusion 29 having a step 24b is formed.

Such a probe 24 is fitted in a spigot-and-socket manner into a recess 5 which is formed in a head 3 of the bolt 1 as described later.

The probe support member 25 includes a base portion 25a and a shaft portion 25b extending upward from the center portion of the upper face of the base portion 25a.

On the lower portion of the base portion 25a, a locking portion 25a1 is formed. To the locking portion 25a1, the upper portion of the probe 24 is detachably attached.

The shaft portion 25b is capable of advancing and retreating through a hollow portion of the rotary shaft 21a.

The attachment member 27 is assumed to be substantially cylindrical.

The attachment member 27 is attached to an outer periphery of the lower portion of the rotary shaft 21a. The method of attaching the attachment member 27 to the rotary shaft 21a includes publicly-known methods such as fitting but is not particularly limited. The attachment member 27 and the rotary shaft 21a may be integrally formed.

The lower end of the attachment member 27 has a flange 27a extending inward in the radial direction. With the upper face of the flange 27a, a stopper member 26 formed of a washer fitted on the front end portion of the shaft portion 25b comes into contact.

The resilient coil spring 28 is arranged in such a manner as to be wound around the periphery of the probe support member 25. The upper end of the resilient coil spring 28 is seated on the lower face of the attachment member 27 and the lower end of the resilient coil spring 28 is seated on the outer peripheral step of the base portion 25a.

In such a probe support member 25, when the base portion 25a is displaced upward against the urging force of the resilient coil spring 28, the shaft portion 25b is made swingable in the hollow portion of the rotary shaft 21a.

In addition, the stopper member 26 prevents the shaft portion 25b from coming out of the hollow portion of the rotary shaft 21a by coming into contact with the upper face of the flange 27a.

The socket 22 has a substantially cylindrical shape. On the inner peripheral side of the upper portion of the socket 22, the lower portion of the rotary shaft 21a is detachably fitted. This restricts the displacement of the socket 22 in the circumferential direction relative to the rotary shaft 21a. Although in the present embodiment, the rotary shaft 21a and the socket 22 are assumed to be spline-fitted to each other, the joint between the rotary shaft 21a and the socket 22 is not limited to the spline-fitting.

According to the tightening device 20 as described above, when the head 3 of the bolt 1 is meshed with the socket 22, an urging force toward the head 3 is applied, by the resilient coil spring 28, to the probe 24 fitted in a spigot-and-socket manner in the recess 5 of the bolt 1.

In addition, according to the tightening device 20 as described above, the socket 22 and the probe unit 23 are joined to the rotary shaft 21a separately and independently of each other.

Moreover, the probe 24 is semi-floating-supported on the rotary shaft 21a due to the resilient coil spring 28 interposed between the probe 24 and the rotary shaft 21a.

Next, the controller 30 will be described.

As illustrated in FIG. 1, the controller 30 mainly includes: an arithmetic processing unit 31, which is composed of a processor such as a central processing unit (CPU); and a storage 32, which is composed of a read only memory (ROM) with programs written therein, a random access memory (RAM) for temporarily storing data, and the like.

The arithmetic processing unit 31 in the present embodiment includes a nut runner instruction section 31a, an axial force calculation section 31b, an elongation calculation section 31c, an echo detection section 31d, a bolt information processing section 31e, and an ultrasound transmission and reception controller 31f.

The nut runner instruction section 31a, as describe later, outputs an instruction to stop the application of the axial force, to the nut runner 21, when the axial force (F) of the bolt 1 reaches a target axial force value.

The axial force calculation section 31b calculates the axial force based on Expression 1 described later. The elongation calculation section 31c calculates elongation of the bolt 1 due to the tightening of the bolt 1 (see FIG. 2). The echo detection section 31d calculates the zero-crossing and the like of the ultrasonic echo. The bolt information processing section 31e outputs information on the bolt 1 to be measured to the storage 32. The ultrasound transmission and reception controller 31f causes the probe 24 to emit an ultrasonic pulse and amplifies an ultrasonic echo thus received.

These constituent components of the arithmetic processing unit 31 will be described in more detail together with the description of the bolt axial force measurement method described later.

The input section 33 is assumed to be a keyboard or the like used for inputting bolt information to the bolt information processing section 31e but may be a touch panel functioning also as a display section 34. In addition, a request task for the arithmetic processing unit 31 may be inputted through the input section 33.

The display section 34 in the present embodiment is assumed to be a monitor, a speaker, or the like that indicates, visually or through audio, information outputted from the arithmetic processing unit 31.

<<Bolt Axial Force Measurement Method>>

Next, the bolt axial force measurement method of the present embodiment will be described.

This bolt axial force measurement method includes: a step of inputting bolt information to the bolt axial force measurement apparatus 10 (bolt information inputting step); a step of setting a bolt 1 (see FIG. 2) on the bolt axial force measurement apparatus 10 (bolt setting step); and a bolt axial force measuring step.

<Bolt Information Inputting Step>

In this bolt information inputting step, information on the bolt 1 to be measured (see FIG. 2) is inputted into the controller 30 (see FIG. 1) through the input section 33.

The bolt information in the present embodiment includes the Young's modulus (E), the effective diameter (A), and the tightening length (L) of the bolt 1 in Expression 1 described below for calculating the axial force F.

$$F=(EA/L)\delta \qquad \text{Expression 1}$$

Note that in Expression 1, the elongation (δ) of the bolt 1 is calculated by the elongation calculation section 31c as described later.

The bolt information is stored in the storage 32 through the bolt information processing section 31e of the controller 30.

<Bolt Setting Step>

Next, the bolt setting step will be described.

Figure 3:
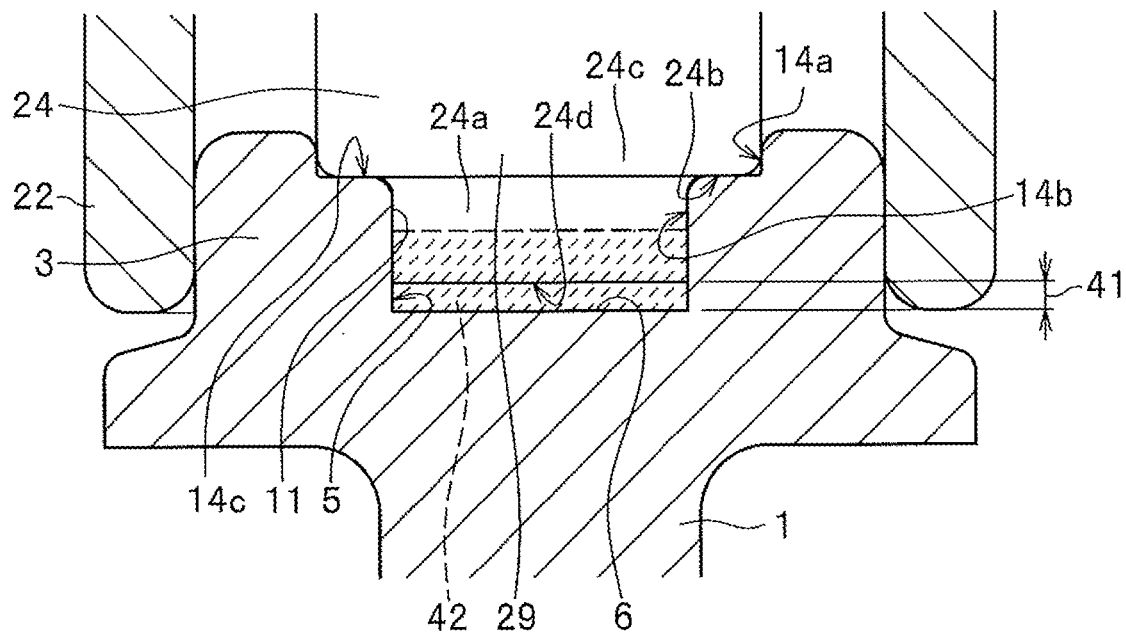
FIG. 3 is an explanatory view of a bolt setting step performed in a bolt axial force measurement method according to the embodiment of the present invention.

FIG. 3 is an explanatory view of the bolt setting step in the bolt axial force measurement method.

As illustrated in FIG. 3, in this bolt setting step, a probe fitting step of fitting the probe 24 into the recess 5 of the bolt 1 and a gap forming step of forming a gap 41 between the bolt 1 and the probe 24 are carried out in parallel.

In the probe fitting step, the probe 24 is fitted in a spigot-and-socket manner into the recess 5 (stepped recess) of the bolt 1.

Specifically, in the probe fitting step, the outer peripheral face of the front end body portion 24c of the probe 24 comes into contact with the inner peripheral face of the large diameter portion 14a of the recess 5.

Then, a projection 24a of the probe 24 is housed in a small diameter portion 14b of the recess 5.

In the gap forming step, the gap 41 is formed between the surface of the bolt 1 defined by the bottom face 6 of the recess 5 and the surface of the probe 24 defined by the top face 24d of the projection 24a.

Specifically, the gap 41 is formed by the step 14c on the bolt 1 side and the step 24b on the probe 24 side coming into contact with each other. This gap 41 is formed by the bottom face 6 of the recess 5 and the top face 24d of the projection 24a facing in parallel.

The gap 41 as described above is filled with a propagating substance 42.

This propagating substance 42 is not particularly limited and includes, for example, publicly-known substances such as machine oil, water, hydrous polymers, liquid paraffin, castor oil, gelatinous substances, and elastomers. Among these, gelatinous substances and elastomers are preferable.

In FIG. 3, reference sign 22 denotes the socket to be fitted on the head 3 of the bolt 1.

<Bolt Axial Force Measuring Step>

Next, the bolt axial force measuring step will be described.

Figure 4:
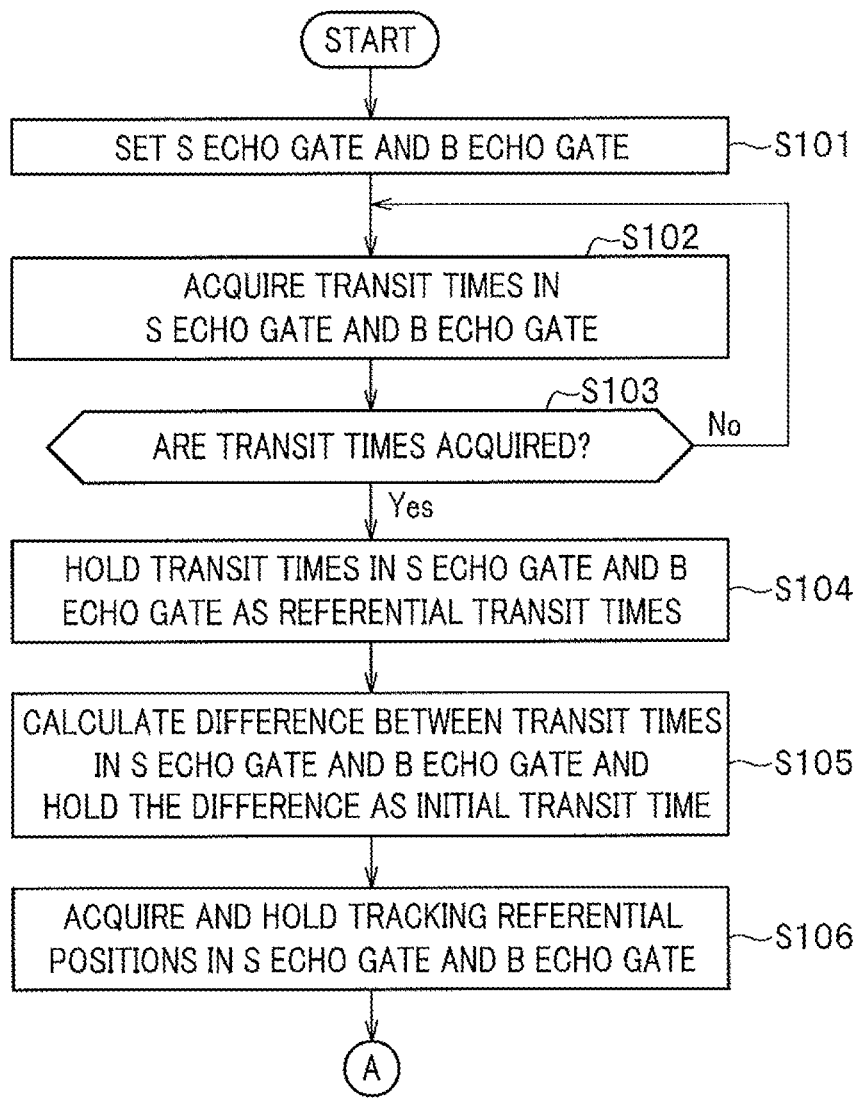
FIG. 4 is a flowchart of a bolt axial force measuring step performed in the bolt axial force measurement method according to the embodiment of the present invention.
Figure 5:
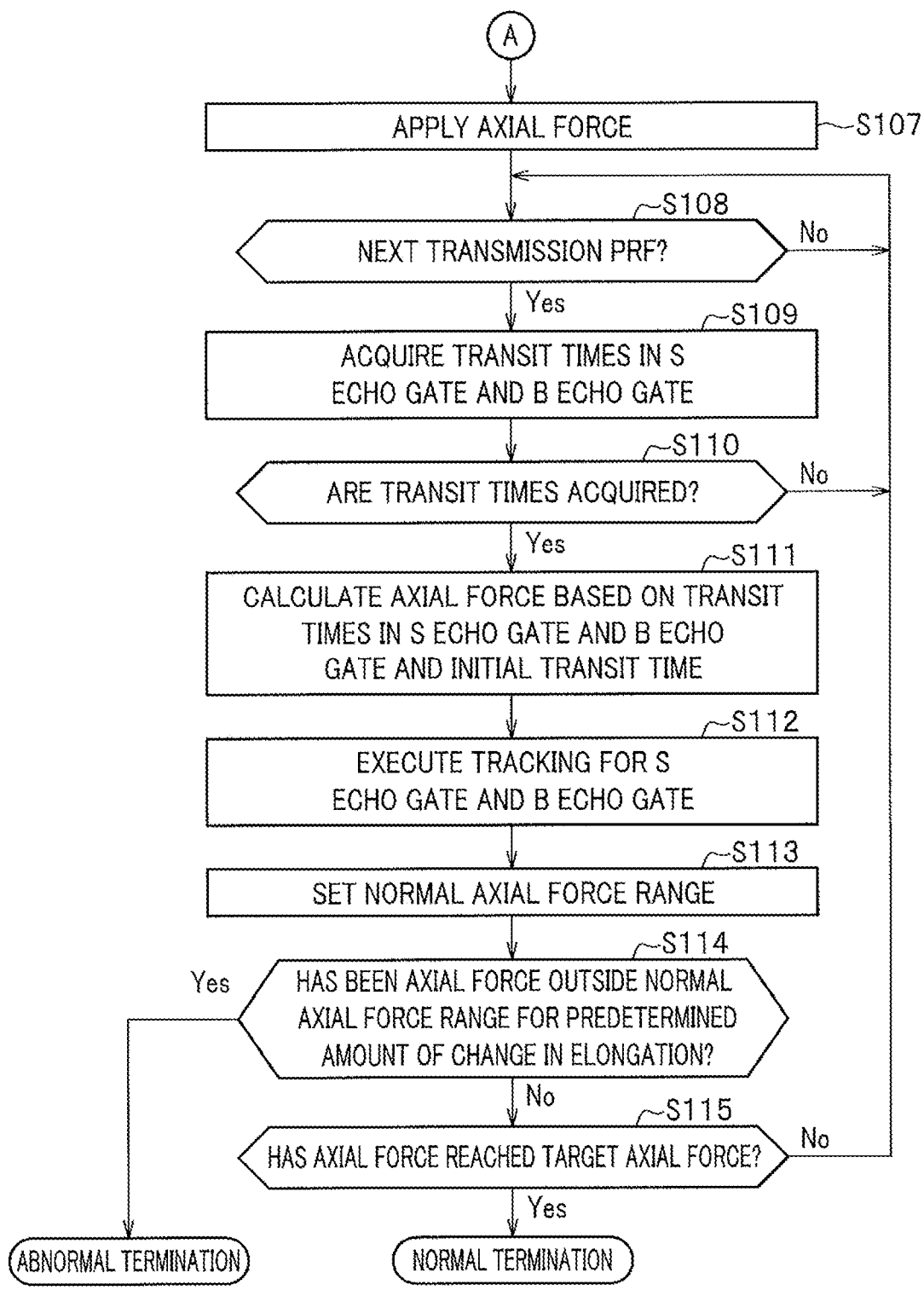
FIG. 5 is a flowchart of the bolt axial force measuring step performed in the bolt axial force measurement method according to the embodiment of the present invention.

FIGS. 4 and 5 are flowcharts of the bolt axial force measuring step.

In this bolt axial force measuring step, a head echo gate (S echo gate) and a bottom echo gate (B echo gate) for the event where the probe 24 (see FIG. 3) emits an ultrasonic pulse to the bolt 1 (see FIG. 3) are set.

These settings are set in advance based on the lengths of the gap 41 (see FIG. 3) and the bolt 1 which the echo detection section 31d (see FIG. 1) has obtained by referring to the storage 32. The transit time ranges for specifying these head echo gate (S echo gate) and bottom echo gate (B echo gate) are stored in the storage 32 by the echo detection section 31d.

These S echo gate and B echo gate are set with transit time ranges wider than those of an S echo gate and a B echo gate for auto-tracking described later. The S echo gate and the B echo gate herein can be set to about two periods of the ultrasonic pulses but are not limited thereto.

Next, in this bolt axial force measuring step, the probe 24 (see FIG. 3) emits an ultrasonic pulse to the bolt 1 (see FIG. 3). This emission of the ultrasonic pulse is carried out in accordance with an instruction from the ultrasound transmission and reception controller 31f (see FIG. 1) of the controller 30 (see FIG. 1). The emission time for the ultrasonic pulse is stored in the storage 32 (see FIG. 1) by the ultrasound transmission and reception controller 31f. In the present embodiment, it is assumed that ultrasonic pulses are emitted (specifically, emitted during application of axial force) with a pulse repetition frequency. However, the emission is not limited to such a configuration.

The ultrasonic pulse is reflected on the surface of the bolt 1 (see FIG. 3) which is defined by the bottom face 6 (see FIG. 3) of the recess 5 (see FIG. 3) and is also reflected on the top end surface of a shank 2.

The probe 24 receives a 0th head echo (S0 echo) reflected on the surface of the bolt 1 (see FIG. 3) and receives a 0th bottom echo (B0 echo) reflected on the bottom face of the bolt 1. Herein, the "0th" means measurement before application of the axial force.

The ultrasound transmission and reception controller 31f (see FIG. 1) then amplifies the S0 echo and the B0 echo received by the probe 24 separately and independently, for example.

The echo detection section 31d acquires the amplified S0 echo and B0 echo from the ultrasound transmission and reception controller 31f and acquires the transit time ranges of the S echo gate and the B echo gate by referring to the storage 32.

Subsequently, the echo detection section 31d sets an S echo gate $G_{S0}$ and a B echo gate $G_{B0}$ based on the S0 echo and the B0 echo (see step S101).

Figure 6:
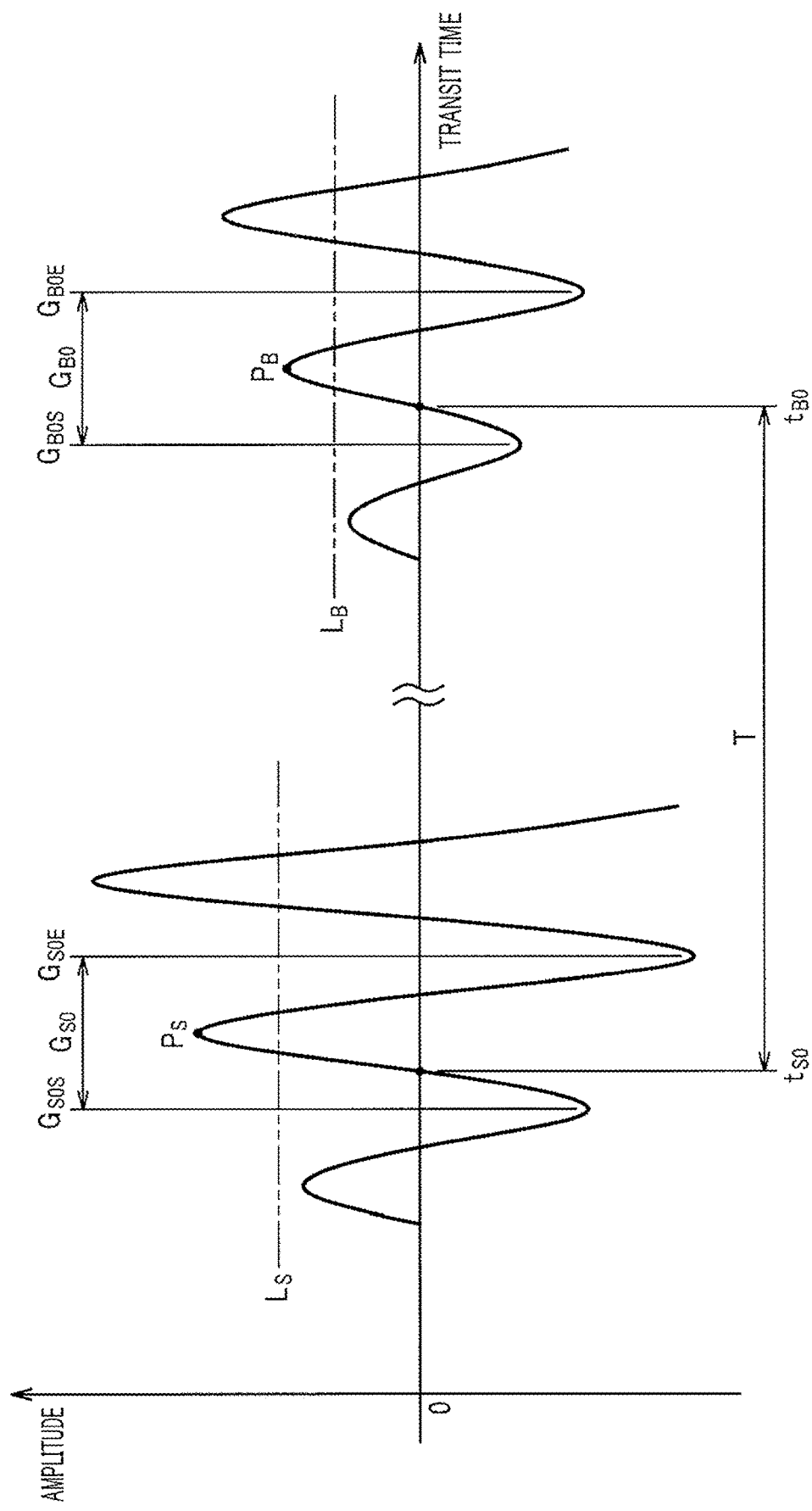
FIG. 6 is a schematic waveform diagram illustrating a head echo and a bottom echo in the bolt axial force measurement method according to the embodiment of the present invention.

Specifically, based on the S0 echo in the transit time range described above, the echo detection section 31d sets a starting point $G_{S0S}$ of the S echo gate $G_{S0}$ to a position ½ wavelength of the ultrasonic pulse before a peak position $P_S$, which is the position of the first peak of the S0 echo the amplitude of which exceeded a level $L_S$ set to a positive or negative value in advance (see FIG. 6). In addition, the echo detection section 31d sets an ending point $G_{S0S}$ of the S echo gate $G_{S0}$ to a position one wavelength of the ultrasonic pulse after the starting point $G_{S0S}$ (see FIG. 6).

In the present embodiment, the level $L_S$ is set to a positive value, and stating that the amplitude exceeds the level $L_S$ means that the amplitude changes from a value smaller (also smaller in absolute value) than the level $L_S$ to a value larger (also larger in absolute value) than the level $L_S$ in a graph with transit time represented on the horizontal axis. The peak position $P_S$ in this case is of a positive peak. When the level $L_S$ is set to a negative value, stating that the amplitude exceeds the level $L_S$ means that the amplitude changes from a value larger (but smaller in absolute value) than the level $L_S$ (the absolute value thereof is smaller) to a value smaller (but larger in absolute value) than the level $L_S$ in a graph with transit time represented on the horizontal axis. The peak position $P_S$ in this case is of a negative peak.

In a similar manner, based on the B0 echo within the transit time range described above, the echo detection section 31d sets a starting point $G_{B0S}$ of the B echo gate $G_{B0}$ to a position ½ wavelength of the ultrasonic pulse before a peak position $P_B$, which is the position of the first peak of the B0 echo the amplitude of which exceeded a level $L_B$ set to a positive or negative value in advance (see FIG. 6). In addition, the echo detection section 31d sets an ending point $G_{B0E}$ of the B echo gate $G_{B0}$ to a position one wavelength of the ultrasonic pulse after the starting point $G_{B0S}$ (see FIG. 6).

In the present embodiment, the level $L_B$ is set to a positive value, and stating that the amplitude exceeds the level $L_B$ means that the amplitude changes from a value smaller than the level $L_B$ to a value larger than the level $L_B$ in a graph with transit time represented on the horizontal axis. The peak position $P_B$ in this case is of a positive peak. When the level $L_B$ is set to a negative value, stating that the amplitude exceeds the level $L_B$ means that the amplitude changes from a value larger (but smaller in absolute value) than the level $L_B$ to a value smaller (but larger in absolute value) than the level $L_B$ in a graph with transit time represented on the horizontal axis. The peak position $P_B$ in this case is of a negative peak.

Subsequently, the echo detection section 31d acquires the transit time of the S0 echo within the S echo gate $G_{S0}$ and the transit time of the B0 echo within the B echo gate $G_{B0}$ (see step S102).

Specifically, the echo detection section 31d detects a zero-crossing just before the positive or negative peak within the S echo gate $G_{S0}$ and acquires transit time $t_{S0}$ at the detected zero-crossing as the transit time of the S0 echo (see FIG. 6). In the present embodiment, the zero-crossing is a point where the amplitude of the echo of an ultrasonic pulse becomes zero.

In a similar manner, the echo detection section 31d detects a zero-crossing just before the positive or negative peak within the B echo gate $G_{B0}$ and acquires transit time $t_{B0}$ at the detected zero-crossing as the transit time of the B0 echo (see FIG. 6).

The echo detection section 31d repeats step S102 (No in step S103) until the echo detection section 31d completes acquiring the transit time of the S0 echo and the transit time of the B0 echo.

Subsequently, after the echo detection section 31d completes acquiring the transit time of the S0 echo and the transit time of the B0 echo (Yes in S103), the echo detection section 31d acquires and holds the starting point $G_{S0S}$ as a tracking referential position of the S echo gate $G_{S0}$ (see step S104) (see FIG. 6).

In a similar manner, the echo detection section 31d acquires and holds the starting point $G_{B0S}$ as a tracking referential position of the B echo gate $G_{B0}$ (see step S104) (see FIG. 6).

Next, in the bolt axial force measuring step, the nut runner instruction section 31a (see FIG. 1) outputs a driving instruction to the nut runner controller 21b (see FIG. 1).

That is, the axial force is applied to the bolt 1 (see FIG. 4) by the tightening device 20 (see FIG. 1) for the bolt 1 (see step S107).

When receiving an echo of the ultrasonic pulse at the next transmission pulse repetition frequency (the n-th PRF; n is a natural number) (Yes in step S108), the echo detection section 31d acquires the transit time of the Sn echo within the S echo gate $G_{Sn-1}$ and the transit time of the Bn echo within the B echo gate $G_{Bn-1}$ (see FIG. S109).

Figure 7:
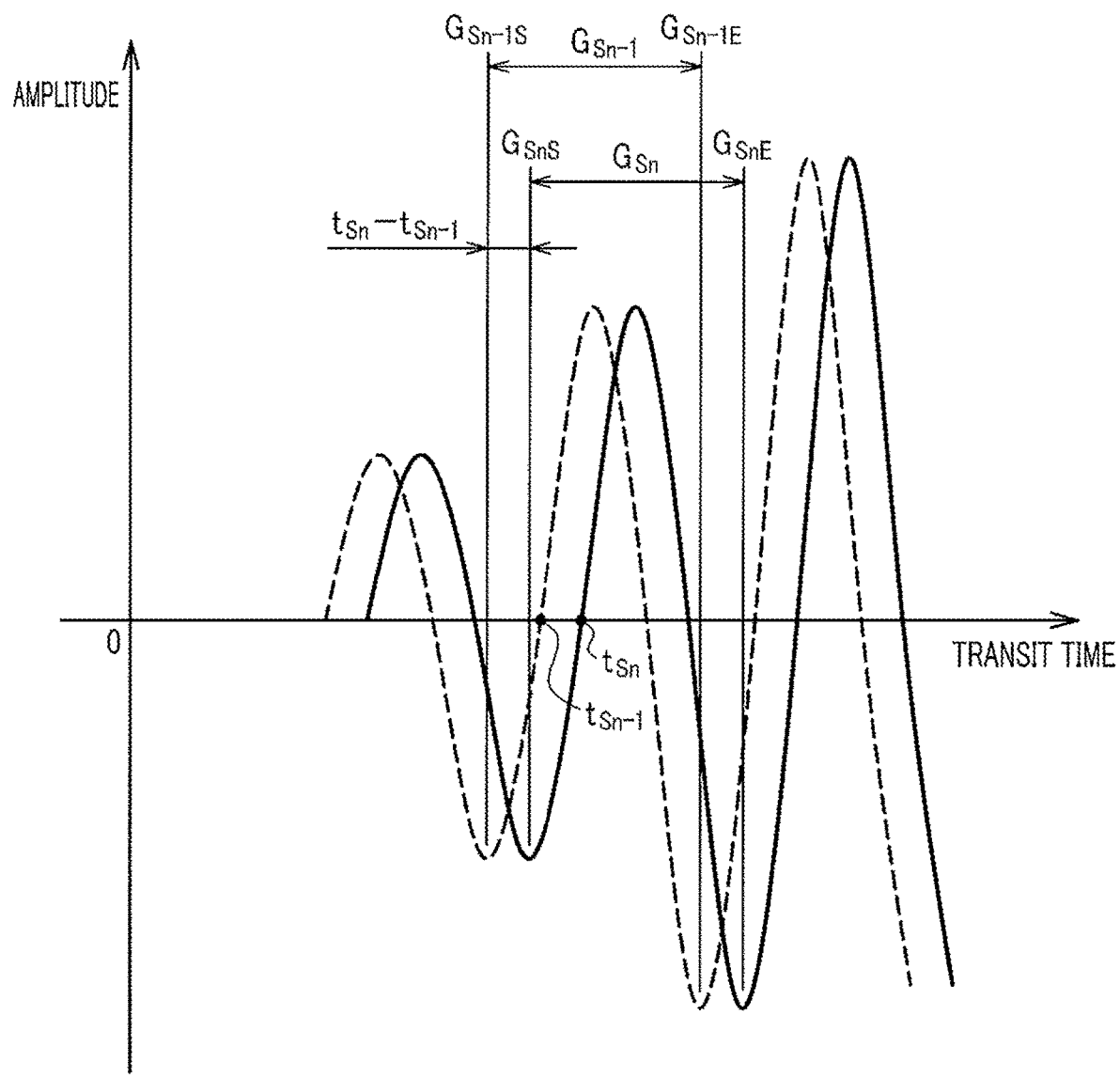
FIG. 7 is an explanatory diagram of gate auto-tracking for a head echo performed in the bolt axial force measurement method according to the embodiment of the present invention.

Specifically, the echo detection section 31d detects a zero-crossing just before the positive or negative peak in the S echo gate $G_{Sn-1}$ and acquires the transit time $t_{Sn}$ at the zero-grossing as the transit time of the Sn echo (see FIG. 7).

Although not illustrated, in a similar manner, the echo detection section 31d detects a zero-crossing just before the positive or negative peak in the B echo gate $G_{Bn-1}$ and acquires the transit time $t_{Bn}$ at the zero-grossing as the transit time of the Bn echo.

The echo detection section 31d repeats step S109 until the echo detection section 31d completes acquiring the transit time of the Sn echo and the transit time of the Bn echo (No in step S110).

Subsequently, after the echo detection section 31d completes acquiring the transit time of the Sn echo and the transit time of the Bn echo (Yes in step S110), the axial force calculation section 31b calculates the axial force F of the bolt 1 based on the transit times $t_{Sn}$ and $t_{Bn}$ and initial transit time T (see step S111).

Herein, the semi-floating-supported probe 24 (see FIG. 2) reduces disturbance in the waveforms of the Sn echo and Bn echo.

Note that the length of the bolt 1 can be obtained based on the difference $(t_{Bn}-t_{Sn})$ between the transit time at the zero-crossing of the Sn echo and the transit time at the zero-crossing of the Bn echo.

The elongation (δ) of the bolt 1 is calculated by the elongation calculation section 31c (see FIG. 1) based on the difference between the transit times calculated by the echo detection section 31d (see FIG. 1).

The axial force calculation section 31b (see FIG. 1) acquires the elongation (δ) of the bolt 1 calculated by the elongation calculation section 31c (see FIG. 1) and acquires the parameters of Expression 1 by referring to the storage 32 (see FIG. 1). The axial force calculation section 31b (see FIG. 1) then calculates the axial force in the bolt 1 with Expression 1 and outputs the calculated axial force to the display section 34 (see FIG. 1) (see step S108).

Subsequently, the echo detection section 31d individually executes tracking for the S echo gate $G_{Sn}$ and the B echo gate $G_{Bn}$ (see step S112).

Specifically, the echo detection section 31d shifts the starting point $G_{Sn-1S}$ of the S echo gate $G_{Sn-1}$ of the previous ((n−1)-th) PRF by a time period $(t_{Sn}-t_{Sn-1})$ to set a starting point $G_{SnS}$ of the S echo gate $G_{Sn}$ of the current (n-th) PRF (see FIG. 7).

The echo detection section 31d also sets an ending point $G_{SnE}$ of the S echo gate $G_{Sn}$ to a position one wavelength of ultrasonic pulse after the starting point $G_{SnS}$ (see FIG. 7).

While the axial force is being applied, the head 3 of the bolt 1 is distorted due to the applied axial force in some cases. The tracking for the S echo gate $G_{Sn}$ is a process to address the distortion of the head 3 for suitable detection of the Sn echo.

Although not illustrated, in a similar manner, the echo detection section 31d shifts the starting point $G_{Bn-1S}$ of the B echo gate $G_{Bn-1}$ of the previous ((n−1)-th) PRF by a time period ($t_{Bn}-t_{Bn-1}$) to set a starting point $G_{BnS}$ of the B echo gate $G_{Bn}$ of the current (n-th) PRF.

The echo detection section 31d also sets an ending point $G_{BnE}$ of the B echo gate $G_{Bn}$ to a position one wavelength of the ultrasound after the starting point $G_{BnS}$.

While the axial force is being applied, the shank 2 of the bolt 1 is elongated due to the applied axial force. The tracking for the B echo gate $G_{Bn}$ is a process to address the elongation of the shank 2 for suitable detection of the Bn echo.

Subsequently, the axial force calculation section 31b sets a normal axial force range based on the calculated axial force (F) (see step S113).

Figure 8:
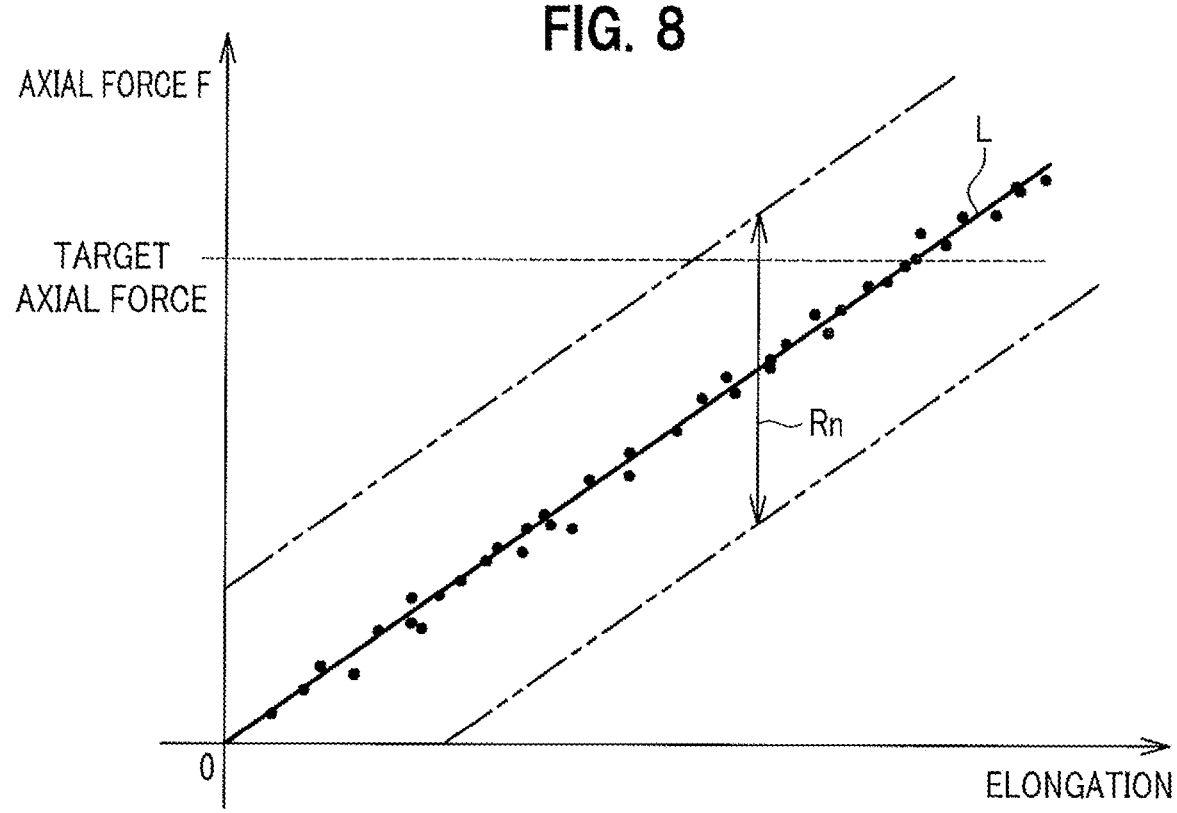
FIG. 8 is a graph example in which calculated bolt axial force is plotted in chronological order.

As illustrated in FIG. 8, specifically, the axial force calculation section 31b calculates a line L approximately representing change in axial force (F) over time, based on the calculated axial force (F) plotted in chronological order.

The axial force calculation section 31b also sets a normal axial force range Rn for the line L using a value set in advance (10% above and below the line L, for example).

Subsequently, when the axial force (F) remains outside the normal axial force range Rn for a previously-set amount of change in elongation (δ) or greater (Yes in step S114), the axial force calculation section 31b determines that the measurement is failing.

In this case, the nut runner instruction section 31a (see FIG. 1) outputs an instruction to stop application of the axial force, to the nut runner 21 (see FIG. 1). That is, the application of the axial force to the bolt 1 is stopped. In addition, although not illustrated, the nut runner 21 is stopped, and auto-tracking is also stopped. This series of the bolt axial force measuring step is thus terminated (abnormal termination).

On the other hand, when the axial force (F) does not remain outside the normal axial force range Rn for the previously-set amount of change in elongation (δ) or grater (No in step S114), the axial force calculation section 31b determines that the measurement is successful.

In addition, the nut runner instruction section 31a (see FIG. 1) acquires the axial force (F) of the bolt 1 calculated by the axial force calculation section 31b (see FIG. 1). The nut runner instruction section 31a then determines whether the axial force (F) of the bolt 1 has reached a target axial force value (see step S115).

When the axial force (F) of the bolt 1 has not yet reached the target axial force value (No in step S115), the nut runner instruction section 31a (see FIG. 1) outputs an instruction to continue the application of the axial force, to the nut runner 21 (see FIG. 1). That is, the process returns to step S108, and the nut runner 21 continues the application of the axial force to the bolt 1.

On the other hand, when the axial force (F) of the bolt 1 has reached the target axial force value (Yes in step S115), the nut runner instruction section 31a (see FIG. 1) outputs an instruction to stop the application of the axial force, to the nut runner 21 (see FIG. 1). That is, the application of the axial force to the bolt 1 is stopped. In addition, although not illustrated, the nut runner 21 is stopped, and auto-tracking is also stopped. This series of the bolt axial force measuring step is thus terminated (normal termination).

Note that this flow may be configured to determine abnormality based on the amount of change in elongation (δ) of the bolt 1 and the normal range thereof, instead of the axial force (F). Specifically, the flow may be configured to terminate the bolt axial force measuring step when the amount of change in elongation (δ) of the bolt 1 has reached a target value.

<Echo Amplification Method>

In the present embodiment, the ultrasound transmission and reception controller 31f includes a first amplitude correction section 31f1, a second amplitude correction section 31f2, and a third amplitude correction section 31f3.

The first amplitude correction section 31f1 corrects the amplitudes in both of the head echo gate and the bottom echo gate by the same amount based on an amplitude amplification which is set for the entire time axis.

Figure 9:
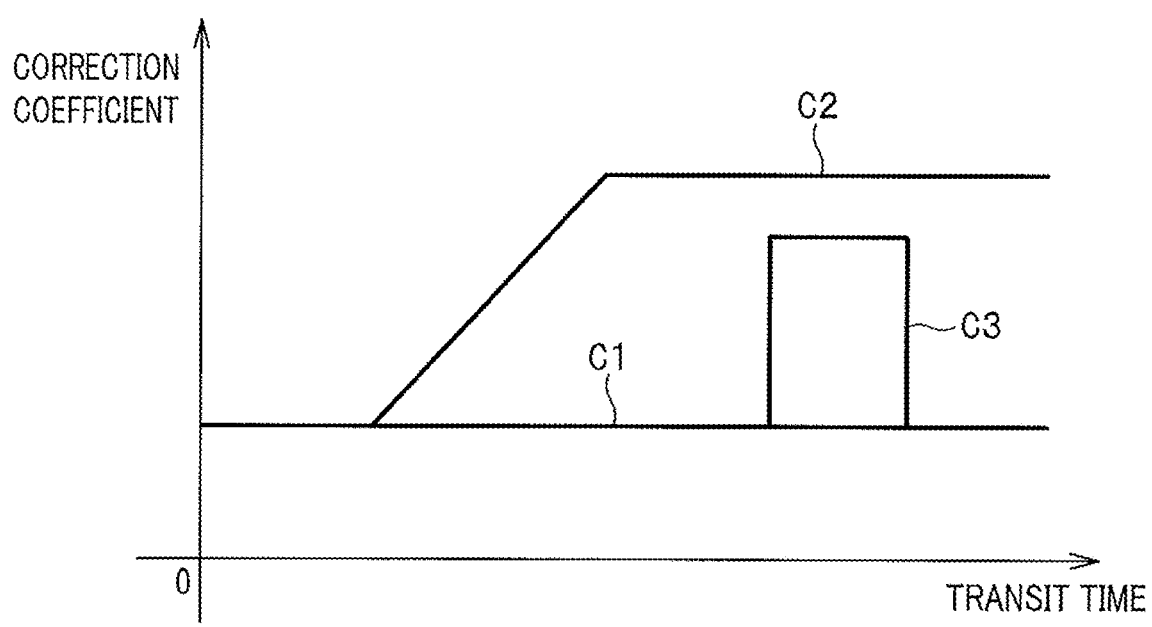
FIG. 9 is an explanatory diagram illustrating coefficients of correction (amplification) of amplitudes of a head echo and a bottom echo.

In the present embodiment, a correction coefficient C1 (see FIG. 9) which is the amplitude amplification is previously set by pre-experiment or the like.

The second amplitude correction section 31f2 makes correction based on the amplitude in one of the head echo gate and the bottom echo gate so that the amplitude in the other is approximated to that in the one of the head echo gate and the bottom echo gate.

In the present embodiment, a correction coefficient C2 (see FIG. 9) which is the amplitude amplification is to make correction to approximate the amplitude of the Bn echo to the amplitude of the Sn echo, and is previously set by pre-experiment or the like. The second amplitude correction section 31f2 multiplies the Bn echo by the correction coefficient C2 at the transit time in the echo gate in which the same Bn echo is detected. The second amplitude correction section 31f2 thereby allows the Sn echo and the Bn echo with the amplitudes set substantially equal to each other in the respective echo gates to be displayed on the display section 34.

The third amplitude correction section 31f3 corrects the amplitude in one of the head echo gate and the bottom echo gate. In the present embodiment, a correction coefficient C3 (see FIG. 9) which is the amplitude amplification is to make correction to approximate the amplitude of the Bn echo to the amplitude of the Sn echo, and is previously set by pre-experiment or the like. The third amplitude correction section 31f3 thereby allows the Sn echo and the Bn echo with the amplitudes set substantially equal to each other in the respective echo gates to be displayed on the display section 34.

Note that the bolt axial force measurement apparatus 10 may be configured to correct amplitudes with any one of the first amplitude correction section 31f1, the second amplitude correction section 31f2, and the third amplitude correction section 31f3 alone or may be configured to correct the amplitude in each echo gate to substantially the same amplitude using both of the second amplitude correction section 31f2 and the third amplitude correction section 31f3.

In the case of using both of the second amplitude correction section 31f2 and the third amplitude correction section 31f3, the bolt axial force measurement apparatus 10 may be configured so that the second amplitude correction section 31f2 first corrects the amplitudes of both of the Sn echo and the Bn echo and the third amplitude correction section 31f3 then corrects the amplitude of the Bn echo. Such a correction method makes it possible to approximate the amplitudes of the Sn echo and the Bn echo in the respective echo gates to each other more accurately.

<<Bolt>>

The bolt 1 (see FIG. 3) for use in the bolt axial force measurement method described above includes the shank 2 (see FIG. 3) and the head 3 (see FIG. 3). The aforementioned bottom face 2c (see FIG. 3) is defined at the front end portion of the shank 2.

On the outer peripheral portion of the head 3, formed is a meshing portion (not illustrated) with which a tightener (for example, a torque wrench or the like) for the bolt 1 is meshed.

As illustrated in FIG. 3, the recess 5 is formed in the head 3. The recess 5 includes the bottom face 6 and a peripheral wall 11 formed around the bottom face 6. The bottom face 6 includes a plane with a bolt axis as a normal thereto.

The thus-configured recess 5 includes a large diameter portion 14a, which is formed on the opening side of the recess 5, and a small diameter portion 14b, which has an inner diameter smaller than that of the large diameter portion 14a and forms the peripheral wall 11. The small diameter portion 14b is connected to the large diameter portion 14a via a step 14c which absorbs the difference in inner diameter.

These large diameter portion 14a, step 14c, and small diameter portion 14b form the recess 5 with a step (stepped recess), which is coaxial with the bolt axis in the head 3 of the bolt 1.

The stepped recess 5 is designed to be fitted, in a spigot-and-socket manner, to the stepped protrusion 29 which includes the step 24b of the probe 24, as described above.

Note that the peripheral wall 11, which constitutes the small diameter portion 14b, extends linearly from the bottom face 6 side toward the opening side of the recess 5 in a side view of the bolt 1 illustrated in FIG. 3. However, the peripheral wall 11 is not limited to such a wall that extends linearly as long as the peripheral wall 11 can be fitted, in a spigot-and-socket manner, to the probe 24, and may be formed to partially bulge outward in the radial direction of the head 3.

<<Operation Effect>>

Next, the operation effects of the present embodiment will be described.

<Operation Effect of Tightening Device>

The conventional tightening device has a problem that since the socket and the ultrasonic sensor are integral with each other, inclination, wobbling, and oscillation of the socket are transmitted to the probe at tightening of a bolt. The conventional tightening device thus has a problem that the tightening device cannot measure the bolt axial force with sufficient accuracy while tightening the bolt.

In contrast, in the tightening device 20 of the present embodiment, the socket 22 and the probe 24 are provided separately and independently.

Figure 10A:
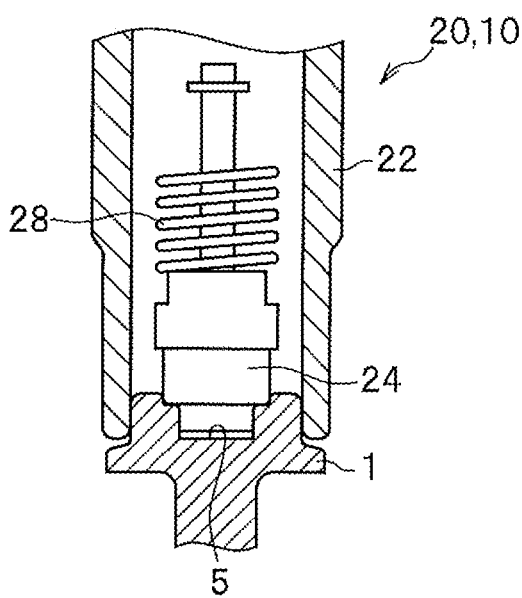
FIGS. 10A and 10B are operation explanatory views of the tightening device included in the bolt axial force measurement apparatus.
Figure 10B:
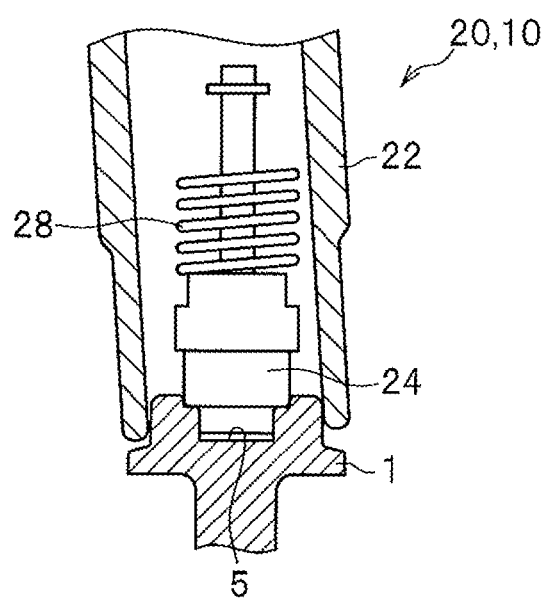

FIGS. 10A and 10B are operation diagrams of the tightening device 20 for the bolt 1, which is included in the bolt axial force measurement apparatus 10.

As illustrated in FIG. 10A, in the tightening device 20 of the present embodiment, the socket 22 and probe 24 are provided separately and independently.

To tighten the bolt 1 with the tightening device 20 as described above, the probe 24 is fitted in a spigot-and-socket manner, into the recess 5 of the bolt 1, and the socket 22 is fitted on the bolt 1. The socket 22 is rotated to tighten the bolt 1, and the probe 24 detects elongation of the bolt 1.

In tightening device 20, as illustrated in FIG. 10B, even when the socket 22 wobbles during tightening of the bolt 1, the angle at which the probe 24 is pressed against the bolt 1 does not change since the probe 24 is provided independently of the socket 22. The tightening device 20 is therefore capable of measuring elongation of the bolt 1 with high accuracy without being influenced by wobbling of the socket 22.

In addition, the probe 24 is semi-floating-supported on the lower end of the rotary shaft 21a (see FIG. 2) through the resilient coil spring 28 as described above.

With this, as illustrated in FIG. 10B, even when the socket 22 inclines relative to the axis of the bolt 1, the probe 24 does not incline relative to the axis of the bolt 1.

The tightening device 20 is thus capable of measuring the axial force with high accuracy.

In the tightening device 20 of the present embodiment, the probe 24 is fitted in a spigot-and-socket manner to the recess 5. In the tightening device 20, the probe 24 is thus firmly fixed to the recess 5. The tightening device 20 is therefore capable of measuring the axial force with high accuracy.

In the tightening device 20 of the present embodiment, the gap 41 is formed between the surface of the bolt 1 defined by the bottom surface 6 of the recess 5 and the surface of the probe 24 defined by the top surface 24d of the protrusion 24a. This gap 41 is filled with the ultrasound propagating substance 42.

According to the tightening device 20 as described above, it is possible to prevent measurement errors due to change in waveform in the gap 41 and the like. The tightening device 20 is therefore capable of measuring the axial force with high accuracy.

<Operation Effect of Bolt Axial Force Measurement Method)

A general bolt for ultrasonic measurement in which the probe is to be placed in the recess formed in the head varies in flatness of the bottom surface of the recess that defines the surface of the bolt, and the like. For this reason, the configuration in which the probe is brought into close contact with the bottom surface of the recess leads to insufficient accuracy in ultrasonic measurements.

In contrast, the bolt axial force measurement method of the present embodiment and the bolt 1 for use in the method include the step 14c in the recess 5.

According to the bolt axial force measurement method and the bolt 1 for use in this method, as described above, the probe 24 is supported by the step 14c to form the gap 41 between the probe 24 and the bottom surface 6 of the recess 5. According to the bolt axial force measurement method, therefore, it is possible to considerably improve the accuracy of ultrasonic measurements.

According to the bolt axial force measurement method of the present embodiment, the gap 41 is filled with the ultrasound propagating substance 42.

In the bolt axial force measurement method, as described above, the attenuation of ultrasound in the gap 41 is reduced. According to the bolt axial force measurement method of the present embodiment, it is possible to measure the axial force with higher accuracy.

In general, when the probe 24 is brought into contact with the surface of the bolt 1 (the bottom surface 6 of the recess 5) to measure a B echo, the origin of oscillation of ultrasound (0 position) cannot be measured due to self-oscillation of the probe 24 when the probe 24 emits ultrasound. For this reason, in the conventional bolt axial force measurement method, a B1 echo (the first bottom echo) cannot be used for axial force measurement, and the axial force is measured based on a B2 echo and the subsequent B echoes (the second bottom echo and subsequent bottom echoes) in which the self-oscillation of the probe 24 is settled. However, there is a problem that the B2 echo and subsequent B echoes are attenuated as compared to the B1 echo and are significantly influenced by noise.

In contrast, in the bolt axial force measurement method of the present embodiment, the provision of the gap 41 allows for measurement of bolt axial force based on the difference in the S1 echo on the surface of the bolt 1 and the B1 echo. With the bolt axial force measurement method of the present embodiment, therefore, use of B1 echo, which is attenuated less than the B2 echo and includes less noise, further improves the accuracy in bolt axial force measurement.

<Operation Effect of Bolt Axial Force Measurement Apparatus>

The bolt axial force measurement apparatus 10 of the present embodiment includes: the echo detection section 31*d* that detects a head echo (Sn echo) and a bottom echo (Bn echo) of an ultrasonic pulse emitted from the head side of the bolt 1 toward the bottom surface of the shank of the bolt 1; and the axial force calculation section 31*b* that calculates the axial force of the bolt 1 based on the time difference between predetermined positions of the head echo and bottom echo detected by the echo detection section 31*d*.

In addition, the echo detection section 31*d* sets the head echo gate $G_{Sn}$ for the head echo and sets the bottom echo gate $G_{Bn}$ for the bottom echo. The arithmetic processing unit 31 executes tracking for a plurality of ultrasonic pulses emitted during tightening of the bolt 1 so that the head echo gate $G_{Sn}$ and bottom echo gate $G_{Bn}$ are shifted independently to include the predetermined positions at the same position in the head echo gate $G_{Sn}$ and bottom echo gate $G_{Bn}$.

With this, the bolt axial force measurement apparatus 10 of the present embodiment independently performs tracking for the head echo and bottom echo without setting a referential gate, thus measuring the axial force (F) of the bolt 1 more reliably with higher accuracy.

Moreover, the bolt axial force measurement apparatus 10 of the present embodiment includes the amplitude correction section (the ultrasound transmission and reception controller 31*f*) which makes correction so that the amplitude of the head echo (Sn echo) in the head echo gate $G_{Sn}$ is approximated to the amplitude of the bottom echo (Bn echo) in the bottom echo gate $G_{Bn}$.

With this, the bolt axial force measurement apparatus 10 of the present embodiment is capable of displaying the head echo (Sn echo) and the bottom echo (Bn echo) with the amplitude heights set substantially equal to each other, irrespective of attenuation of the bottom echo (Bn echo).

In the bolt axial force measurement apparatus 10 of the present embodiment, the amplitude correction section includes at least one of the first amplitude correction section 31*f*1 with the amplitude amplification being set for the entire time axis, which corrects the amplitudes in both of the head echo gate $G_{Sn}$ and the bottom echo gate GBn based on the amplification; and the second amplitude correction section 31*f*2, which makes correction based on one of the head echo gate $G_{Sn}$ and bottom echo gate $G_{Bn}$ so that the amplitude of the other one of the head echo gate $G_{Sn}$ and bottom echo gate $G_{Bn}$ is approximated to the amplitude of the one of the head echo gate $G_{Sn}$ and bottom echo gate $G_{Bn}$.

With this, the bolt axial force measurement apparatus 10 of the present embodiment is capable of displaying the head echo (Sn echo) and bottom echo (Bn echo) with the amplitude heights set substantially equal to each other.

In addition, in the bolt axial force measurement apparatus 10 of the present embodiment, the echo detection section 31*d* sets the head echo gate to one wavelength of the ultrasonic pulse around the positive or negative peak just after the amplitude of the head echo exceeds the first predetermined value $L_S$ and sets the bottom echo gate to one wavelength of ultrasonic pulse around the positive or negative peak just after the amplitude of the bottom echo exceeds the second predetermined value $L_B$.

Moreover, for each of the head echo gate and the bottom echo gate, the echo detection section 31*d* sets the predetermined position to the point at which the amplitude becomes zero just before the positive or negative peak.

With this, in the bolt axial force measurement apparatus 10 of the present embodiment, by setting the range of each echo gate narrower and elongated after the predetermined position, it is possible to favorably track displacement of each echo due to elongation and the like.

The embodiment of the present invention has been described so far. However, the present invention is not limited to the above-described embodiment and can be carried out in various modes.

The embodiment has been described using the tightening device 20, which tightens the head 3 of the bolt 1 with the socket 22, as an example. The tightening device 20 of the present invention may be configured to tighten a nut (not illustrated) meshed with the bolt 1. In addition, the present invention can be embodied as a non-transitory computer readable medium storing a bolt axial force measurement program causing a computer to function as the bolt axial force measurement apparatus 10.

What is claimed is:

1. A bolt axial force measurement apparatus comprising:
   an echo detection section which detects a head echo and a bottom echo of an ultrasonic pulse emitted from a head side of a bolt toward a bottom surface of a shank of the bolt, and
   an axial force calculation section which calculates an axial force of the bolt based on a time difference between predetermined positions of the head echo and bottom echo detected by the echo detection section, wherein
   the echo detection section sets a head echo gate for the head echo and sets a bottom echo gate for the bottom echo;
   executes tracking for a plurality of ultrasonic pulses emitted during tightening of the bolt so that the head echo gate and bottom echo gate are shifted independently to include the predetermined positions at the same position in the head echo gate and bottom echo gate.

2. The bolt axial force measurement apparatus according to claim 1, further comprising an amplitude correction section which makes correction so that an amplitude of the head echo in the head echo gate and an amplitude of the bottom echo in the bottom echo gate are approximated.

3. The bolt axial force measurement apparatus according to claim 2, wherein the amplitude correction section includes at least one of a first amplitude correction section which corrects amplitudes in both of the head echo gate and the bottom echo gate by a same amount based on an amplitude amplification which is set for an entire time axis, and a second amplitude correction section makes correction based on an amplitude in one of the head echo gate and the bottom echo gate so that an amplitude in the other is approximated to that in the one of the head echo gate and the bottom echo gate.

4. The bolt axial force measurement apparatus according to claim 1, wherein the echo detection section sets the head echo gate to one wavelength of the ultrasonic pulse around a positive or negative peak just after the amplitude of the head echo exceeds a first predetermined value, and sets the bottom echo gate to one wavelength of ultrasonic pulse around a positive or negative peak just after the amplitude of the bottom echo exceeds a second predetermined value $L_B$, and for each of the head echo gate and the bottom echo gate, the echo detection section sets the predetermined position to a point at which the amplitude becomes zero just before the positive or negative peak.

5. A non-transitory computer readable medium storing a bolt axial force measurement program which causes a computer to function as the bolt axial force measurement apparatus according to claim 1.

6. A non-transitory computer readable medium storing a bolt axial force measurement program which causes a computer to function as the bolt axial force measurement apparatus according to claim 2.

7. A non-transitory computer readable medium storing a bolt axial force measurement program which causes a computer to function as the bolt axial force measurement apparatus according to claim 3.

8. A non-transitory computer readable medium storing a bolt axial force measurement program which causes a computer to function as the bolt axial force measurement apparatus according to claim 4.

\* \* \* \* \*